(12) United States Patent
Muramoto et al.

(10) Patent No.: US 8,970,895 B2
(45) Date of Patent: Mar. 3, 2015

(54) IMAGE FORMING APPARATUS FOR PRINTING ON FRONT AND BACK OF PAPER

(71) Applicant: Konica Minolta, Inc., Chiyoda-ku (JP)

(72) Inventors: Kouki Muramoto, Toyohashi (JP);
Taisuke Minemura, Okazaki (JP);
Takashi Gonda, Toyokawa (JP);
Kenichi Yamamoto, Toyokawa (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 13/921,407

(22) Filed: Jun. 19, 2013

(65) Prior Publication Data

US 2013/0342874 A1    Dec. 26, 2013

(30) Foreign Application Priority Data

Jun. 21, 2012 (JP) ................. 2012-140054

(51) Int. Cl.
*G06F 15/00* (2006.01)
*G06K 15/02* (2006.01)
*G03G 15/36* (2006.01)
*H04N 1/00* (2006.01)
*H04N 1/203* (2006.01)
*H04N 1/23* (2006.01)

(52) U.S. Cl.
CPC ............ *G06K 15/1868* (2013.01); *G03G 15/36* (2013.01); *H04N 1/00639* (2013.01); *H04N 1/203* (2013.01); *H04N 1/2323* (2013.01); *H04N 1/2384* (2013.01); *G06K 2215/0082* (2013.01); *G03G 2215/00877* (2013.01)
USPC ........................................................ 358/1.18

(58) Field of Classification Search
USPC ........................................................ 358/1.18
See application file for complete search history.

(56) References Cited

U.S. PATENT DOCUMENTS

| 2008/0094461 A1* | 4/2008 | Terada et al. ................. 347/104 |
| 2009/0282998 A1 | 11/2009 | Richards |
| 2010/0089266 A1 | 4/2010 | Richards |

FOREIGN PATENT DOCUMENTS

| JP | 07-096647 A | 4/1995 |
| JP | 11-021010 | 1/1999 |
| JP | 11-327364 A | 11/1999 |
| JP | 2001-211309 A | 8/2001 |

(Continued)

OTHER PUBLICATIONS

Official Action issued by Japanese Patent Office on Aug. 19, 2014 in Japanese Application No. 2012-140054, and English language translation of Official Action (4 Pgs).

*Primary Examiner* — Saeid Ebrahimi Dehkordy
(74) *Attorney, Agent, or Firm* — Buchanan Ingersoll & Rooney PC

(57) ABSTRACT

An image forming apparatus acquires front and back images to be formed on paper and divides the front and back images of paper into a first image formed a part of the front image, a second image formed of the remaining part of the front image and a part of the back image, and a third image formed of the remaining part of the back image. The image forming apparatus forms the first and second images on the paper folded at the first position, and forms the third image on the paper folded at the second position. The image forming apparatus forms the first to third images such that the part of the front image and the remaining part of the front image constitute the front image and the part of the back image and the remaining part of the back image constitute the back image when the paper is unfolded.

11 Claims, 22 Drawing Sheets

(56) References Cited

FOREIGN PATENT DOCUMENTS

| JP | 2003-012169 A | 1/2003 |
| JP | 2003-046752 A | 2/2003 |
| JP | 2007-302376 A | 11/2007 |
| JP | 2011-519759 A | 7/2011 |

* cited by examiner

IMAGE FORMING APPARATUS FOR PRINTING ON FRONT AND BACK OF PAPER

This application is based on Japanese Patent Application No. 2012-140054 filed with the Japan Patent Office on Jun. 21, 2012, the entire content of which is hereby incorporated by reference.

BACKGROUND OF THE INVENTION

1. Field of the Invention

The present invention relates to an image forming apparatus for printing on a the front and back of paper, and more particularly to an image forming apparatus for printing on the front and back of paper having a size exceeding the maximum paper-feed size.

2. Description of the Background Art

Electrophographic image forming apparatuses include, for example, MFP (Multifunction Peripheral) with a scanner function, a facsimile function, a copy function, a printer function, a data communication function, and a server function, facsimile machines, copiers, and printers.

Image forming apparatuses have the maximum paper size that can be fed (for example, A3 size or A4 size). This size is called the maximum paper-feed size. In order to print on paper having a size exceeding the maximum paper-feed size, a more expensive and larger image forming apparatus (such as a copier or a printer) that supports such size of paper has to be used. In this respect, a technique for printing on paper having a size exceeding the maximum paper-feed size has been proposed, in which paper folded in two is fed. For example, Document 1 below discloses a technique of forming an image on large-size recording paper by folding recording paper in two, forming toner images on both sides of the recording paper folded in two, and unfolding the recording paper after fixing.

Documents 2 and 3 below disclose a technique related to operation of a paper feeder in feeding paper folded in two. Document 2 below discloses a paper feeder including a paper stage on which paper is placed, a separation paper feed roller pair located downstream of the paper stage for feeding paper, and a bringing roller coming into abutment with the upper surface of paper placed on the paper stage for bringing the paper closer to the separation paper feed roller pair. This paper feeder can switch between a first mode in which the rollers of the separation paper feed roller pair are rotated in a direction in which paper is output to the downstream side and the bringing roller is not brought into abutment with the upper surface of paper, and a second mode in which rotation of a separation roller of the separation paper feed roller pair is stopped and the bringing roller is brought into abutment with the upper surface of paper.

Document 3 discloses a sheet feeder in which when the conveyed sheets overlie one another, separation means separates the sheets one by one. This sheet feeder allows the separation means to stop the separating operation when information about the conveyed sheet indicates a folded sheet.

Document 1: Japanese Laid-Open Patent Publication No. 11-327364
Document 2: Japanese Laid-Open Patent Publication No. 2003-12169
Document 3: Japanese Laid-Open Patent Publication No. 2007-302376

Conventionally, when double-sided printing is done on paper having a size exceeding the maximum paper-feed size, an image forming apparatus does printing in the following manner. The image forming apparatus does printing, first, on the right half of the front and then on the left half of the front of paper folded in two with the front facing outside. The image forming apparatus then does printing on the right half of the back and finally on the left half of the back of the paper folded in two with the back facing the outside.

In the conventional techniques, when double-sided printing is done on paper having a size exceeding the maximum paper-feed size, the efficiency in printing is poor because the image forming apparatus has to make, in total, at least four prints as described above.

SUMMARY OF THE INVENTION

An object of the present invention is to provide an image forming apparatus with improved efficiency in printing.

An image forming apparatus according to an aspect of the present invention includes an image acquisition unit for acquiring front and back images to be formed on paper, an image division unit for dividing the front and back images into a first image formed of a part of the front image, a second image formed of a remaining part of the front image and a part of the back image, and a third image formed of a remaining part of the back image, a first image forming unit for forming the first and second images on the paper folded at a first position, and a second image forming unit for forming the third image on the paper folded at a second position. The first and second image forming units form images such that the part of the front image and the remaining part of the front image constitute the front image and the part of the back image and the remaining part of the back image constitute the back image when the paper is unfolded.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a diagram schematically showing a method of dividing images to be formed on the front and back of paper to print on.

DESCRIPTION OF THE PREFERRED EMBODIMENTS

Embodiments of the present invention will be described below with reference to the figures.

In the following description of embodiments, an image forming apparatus is an MFP. In place of an MFP, the image forming apparatus may be a facsimile machine, a copier, a printer, or the like.

First Embodiment

Figure 1:
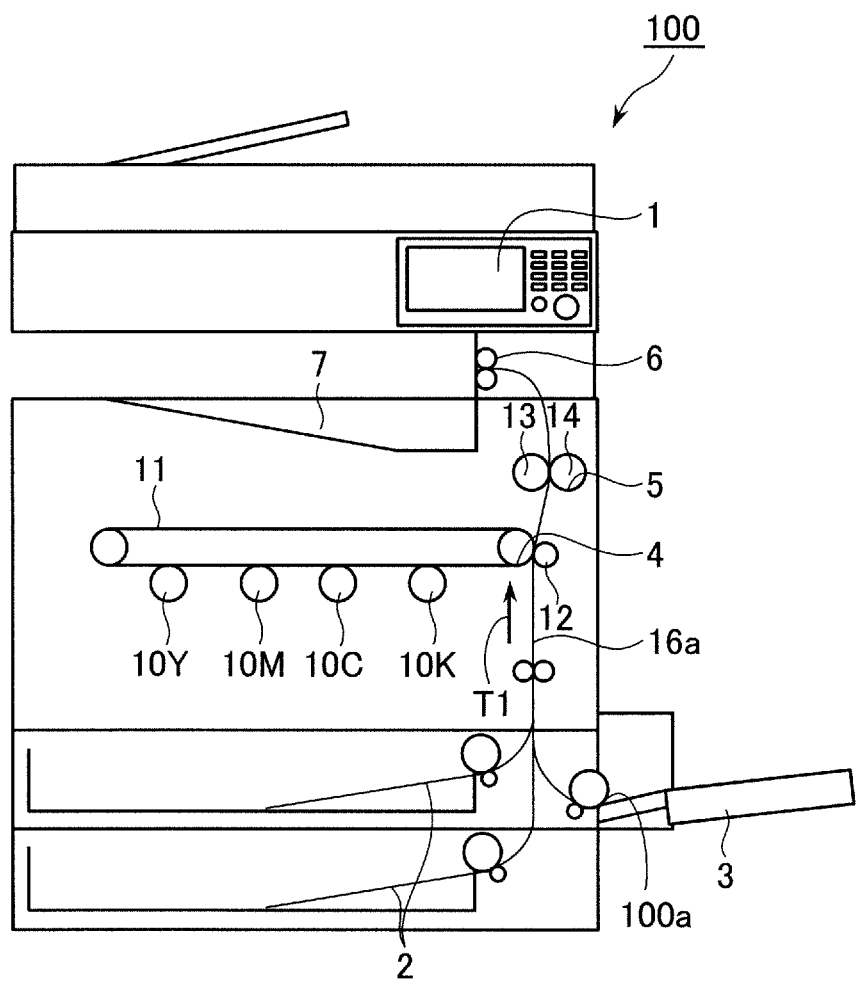
FIG. 1 is a cross-sectional view showing an overall configuration of an MFP 100 in a first embodiment of the present invention.

Referring to FIG. 1, an MFP 100 (an example of the image forming apparatus) mainly includes an operation panel 1, a plurality of paper feed cassettes 2, a paper feed tray 3, an image forming unit 4, a fixing unit 5, a paper discharge roller 6, and a paper feed tray 7. On the upstream side of a paper conveyance path 16a, paths from a plurality of paper feed cassettes 2 and a path from paper feed tray 3 join with each other, and on the downstream side from this junction point, image forming unit 4, fixing unit 5, and paper discharge roller 6 are arranged in this order.

Operation panel 1 is arranged on the top on the front side of MFP 100. Operation panel 1 displays a variety of information such as a status of MFP 100, print settings, and the accepted instruction. Operation panel 1 accepts an operation on MFP 100 from a user.

Paper in various sizes (for example, A4 size or B5 size) to be fed to the inside of MFP 100 is accommodated in a plurality of paper feed cassettes 2. Paper feed tray 3 is a manual feed tray which is coupled to a paper feed unit 100a to the inside of MFP 100 and in which paper of any given size to be fed to the inside of MFP 100 is arranged.

Image forming unit 4 is configured to be able to form a color image on paper by combining four color images in a tandem manner. Image forming unit 4 mainly includes imaging units 10Y, 10M, 10C, and 10K for forming respective color toner images of Y (yellow), M (magenta), C (Cyan), and K (black), and an intermediate transfer belt 11 onto which toner images formed by imaging units 10Y, 10M, 10C, and 10K are transferred (primary transfer), and a secondary transfer unit 12 for transferring the toner images on intermediate transfer belt 11 onto paper.

Fixing unit 5 includes a heating unit 13 and a pressing roller 14. Fixing unit 5 conveys paper sandwiched between heating roller 13 and pressing roller 14, and thermally fuses toner on the paper and fixes the fused toner on the paper by heating and pressing the paper with heating roller 13 and pressing roller 14 during conveyance.

Paper accommodated in paper feed cassette 2 or paper feed tray 3 is conveyed through paper-conveyance path 16a along a paper conveyance direction shown by arrow T1. A toner image is transferred onto the paper being conveyed by image forming unit 4 and thermally fixed by fixing unit 5. One print is thus finished. The printed paper is discharged to paper discharge tray 7 by paper discharge roller 6.

Figure 2:
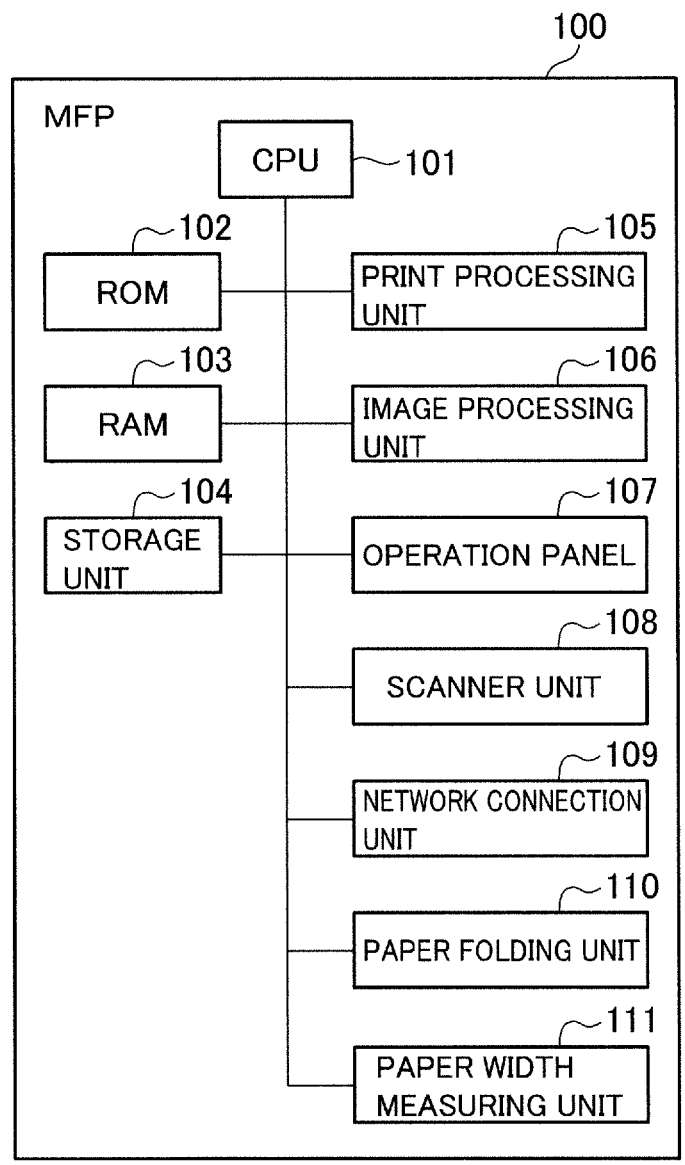
FIG. 2 is a block diagram showing an internal configuration of an MFP 100 in the first embodiment of the present invention.

FIG. 2 is a block diagram showing an internal configuration of MFP 100 in the first embodiment of the present invention.

Referring to FIG. 2, MFP 100 mainly includes a CPU (Central Processing Unit) 101, a ROM (Read Only Memory) 102, a RAM (Random Access Memory) 103, a storage unit 104, a print processing unit 105, an image processing unit 106, an operation panel 107, a scanner unit 108, a network connection unit 109, a paper folding unit 110, and a paper width measuring unit 111. ROM 102, RAM 103, storage unit 104, print processing unit 105, image processing unit 106, operation panel 107, scanner unit 108, network connection unit 109, paper folding unit 110, and paper width measuring unit 111 are each connected to CPU 101 through a bus.

CPU 101 performs central control on MFP 100 for a variety of jobs such as a scan job, a copy job, a mail transmission job, and a print job. CPU 101 also executes a control program stored in ROM 102. CPU 101 performs predetermined processing to read data from ROM 102 or RAM 103 and write data into ROM 102 or RAM 103.

ROM 102 is, for example, a flash ROM (Flash Memory). A variety of programs for operating MFP 100 and a variety of fixed data are stored in ROM 102. ROM 102 may be non-rewritable.

RAM 103 is a main memory of CPU 101. RAM 103 is used to temporarily store data necessary for CPU 101 to execute a control program, and image data.

Storage unit 104 is, for example, an HDD (Hard Disk Drive) and stores device installation information or a variety of data related to operation of MFP 100.

Print processing unit 105 performs print processing on paper based on image data processed by image processing unit 106.

Image processing unit 106 performs, for example, an RIP (Raster Image Processing) process for print data or a conversion process of converting the format of data to be transmitted to the outside.

Operation panel 107 includes a key input unit including a ten keypad, a start key, etc. and a display unit including a touch panel and accepts a variety of input operations, for example, to execute a variety of jobs in MFP 100 from a user. Operation panel 107 also displays a variety of setting items for MFP 100 and messages to a user.

Scanner unit 108 reads a document image.

Network connection unit 109 communicates with external equipment (not shown) via a communication protocol such as TCP/IP in accordance with an instruction from CPU 101.

Figure 17:
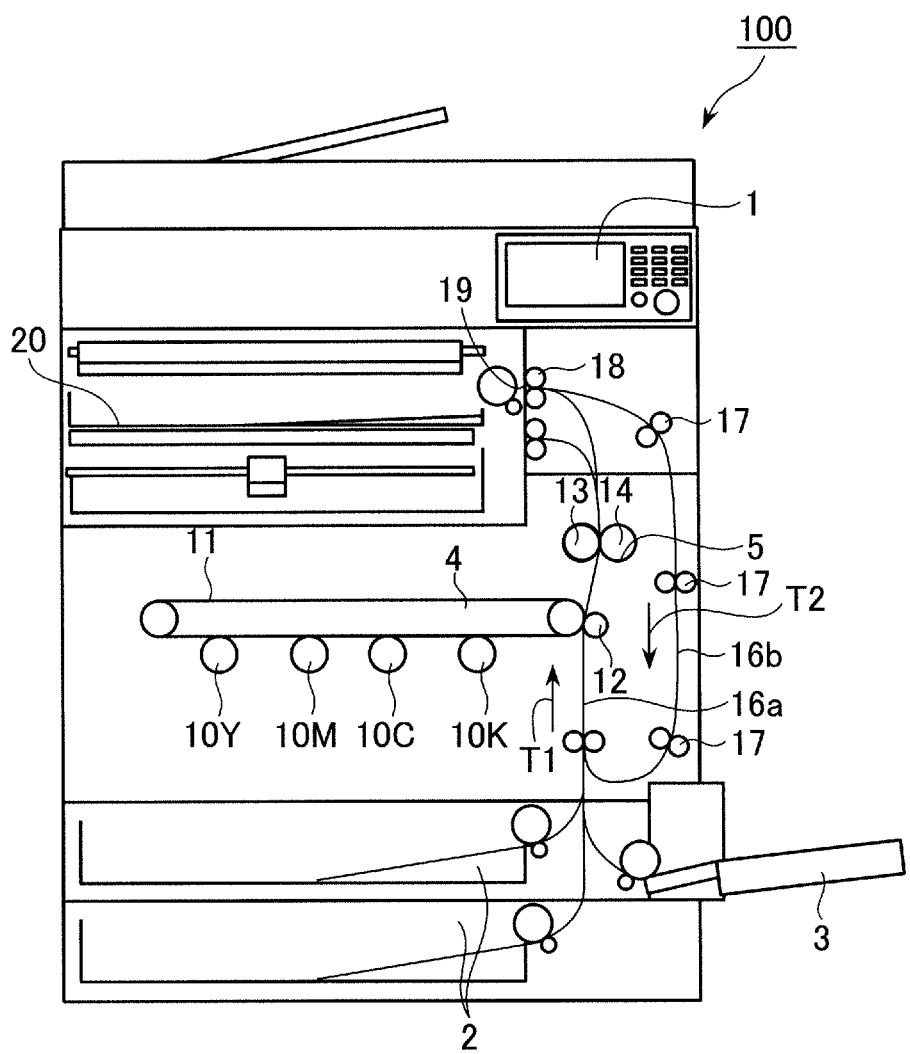
FIG. 17 is a cross-sectional view showing an overall configuration of an MFP 100 in a fourth embodiment of the present invention.

Paper folding unit 110 determines a fold position of paper. Paper folding unit 110 folds paper at a determined position in a case where MFP 100 includes an automatic folding device 21 (FIG. 13) and/or an output paper finisher 20 (FIG. 17).

Figure 4:
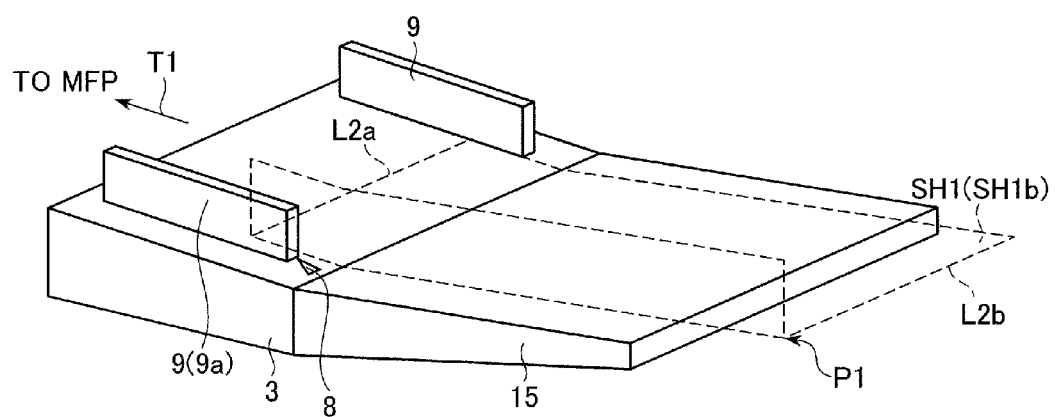
FIG. 4 is a diagram schematically showing that paper is set in a paper feed tray 3 in first print in the first embodiment of the present invention.

Paper width measuring unit 111 measures the width of paper arranged on paper feed tray 3, for example, based on the position of a side restricting plate 9a (FIG. 4).

When accepting a job of fold printing (printing in a folded paper feed mode), MFP 100 conveys paper, larger than the maximum paper-feed size of MFP 100, in a folded state into the apparatus and performs printing. MFP 100 completes double-sided printing on paper larger than the maximum paper-feed size by making three prints in total.

In the following description, it is assumed that the maximum paper-feed size of MFP 100 is A4 size unless otherwise specified, and that the maximum paper-feed width (the maximum length in the direction vertical to the paper conveyance direction of paper that can be fed) of MFP 100 is the length of the short side of A4-size paper. It is assumed that the size of paper to print on is A3 size. An image to be formed on the front of paper is an alphabet "A" and an image to be formed on the back of paper to print on is an alphabet "B." It is assumed that the alphabet "A" and the alphabet "B" are printed in the same orientation in the up-down direction.

A method of folding and setting paper in paper feed tray 3 will now be described.

Figure 3:
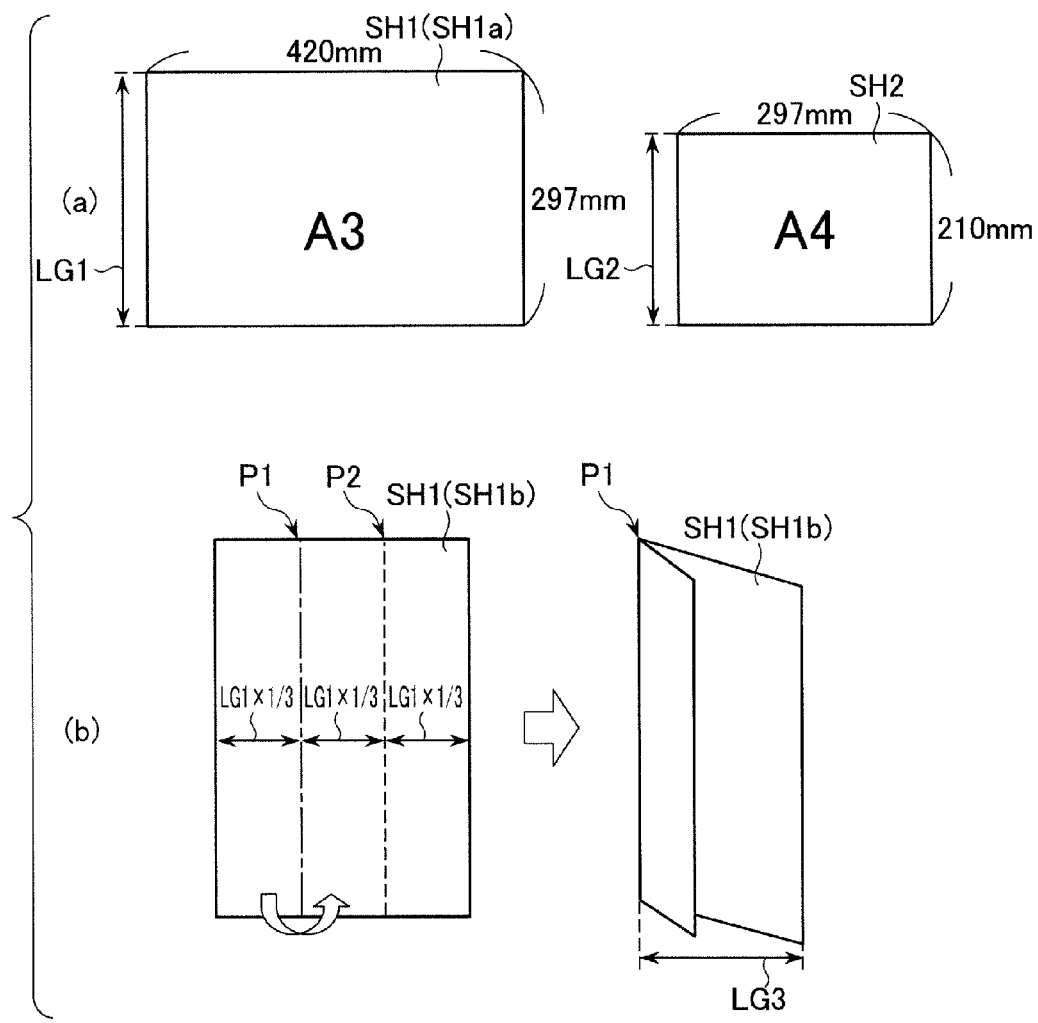
FIG. 3 is a diagram schematically showing a fold position of paper in the first embodiment of the present invention.

FIG. 3 is a diagram schematically showing a fold position of paper in the first embodiment of the present invention. In FIG. 3, FIG. 7 to FIG. 9, and FIG. 11, a mountain-fold line is shown by a dotted line, and a valley-fold line is shown by an alternate long and short dashed line.

Referring to FIG. 3(a), the length LG1 of the short side of A3-size rectangular paper SH1 is 297 mm, and the length of the long side thereof is 420 mm. The length LG2 of the short side of A4-size rectangular paper SH2 is 210 mm, and the length of the long side thereof is 297 mm. Here, the maximum paper-feed width of MFP 100 is equal to the length LG2 (210 mm) of the short side of paper SH2. Paper SH1 has the short side and long side longer than the maximum paper-feed width of MFP 100 and therefore cannot be fed through the inside of MFP 100 as it is (in an expanded state).

In order to enable paper SH1 to be fed through the inside of MFP 100, as shown in FIG. 3(b), the upper and lower short sides of paper SH1 are folded in advance at a position P1 or P2 such that the two long sides are parallel to each other and the two long sides do not overlap each other. The position P1 or P2 is set, for example, at a position inside from the end on the short side of paper SH1 by a length of one third of the short side. Accordingly, the length LG3 of the short side of the folded paper SH1 is two thirds of the length LG1 of the short side of paper in the expanded state (LG2=LG1×⅔).

The fold position of paper may be any position as long as two sides of paper that are parallel to each other and are not folded do not overlap each other. Preferably, paper folding unit 110 determines a fold position of paper based on the size of paper to print on (paper to be fed through the inside of MFP 100).

Figure 5:
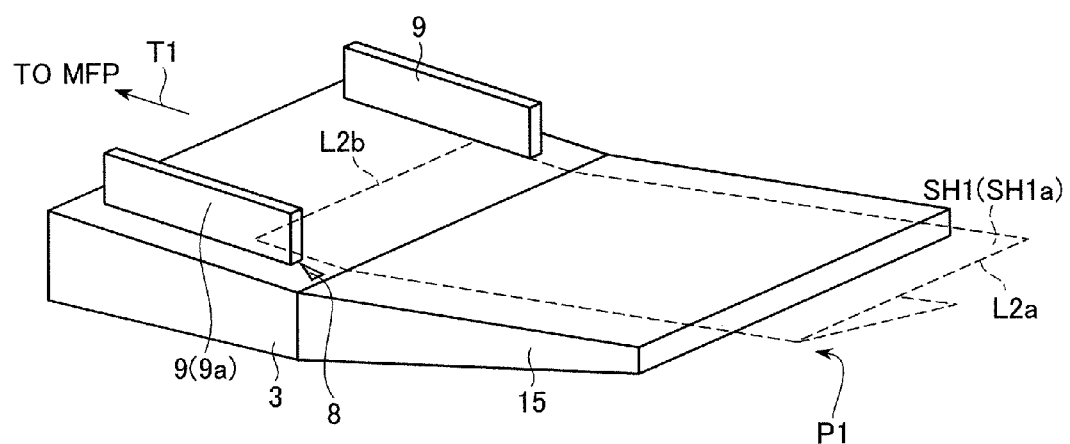
FIG. 5 is a diagram schematically showing that paper is set in paper feed tray 3 in second print in the first embodiment of the present invention.
Figure 6:
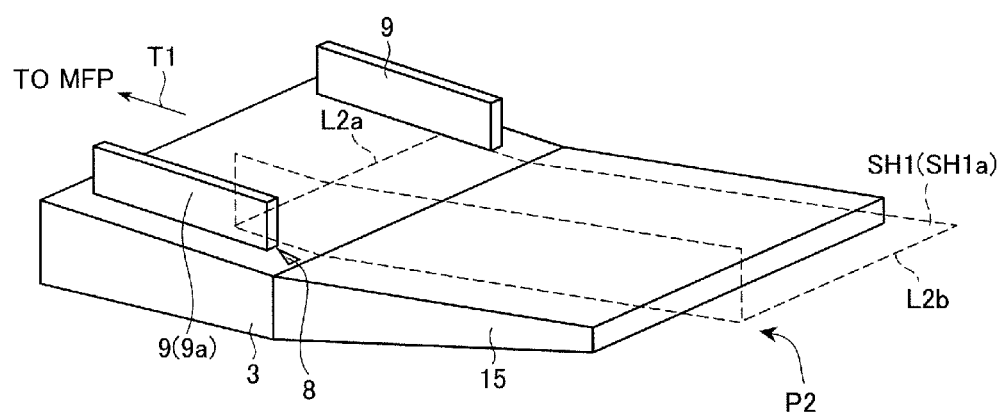
FIG. 6 is a diagram schematically showing that paper is set in paper feed tray 3 in third print in the first embodiment of the present invention.

FIG. 4 to FIG. 6 are diagrams schematically showing that paper is set in paper feed tray 3 in the first embodiment of the present invention.

Referring to FIG. 4, paper feed tray 3 includes two side-restricting plates 9 and a stage 15. Each of side-restricting plates 9 is arranged on stage 15 so as to extend parallel to the paper conveyance direction shown by arrow T1. One side-restricting plate 9a of the side-restricting plates 9 is movable in a direction vertical to the paper conveyance direction. The distance between side-restricting plates 9 is adjusted by the operator in accordance with the length (width) LG3 of the short side of the folded paper SH1.

When double-sided printing on paper SH1 is performed, paper SH1 is arranged on stage 15 with the direction of front/back of paper and the direction of the ridge of the fold being aligned with a predetermined direction by the operator. Specifically, paper SH1 is folded at the position P1 and is arranged with the back SH1b facing upward. Paper SH1 is arranged such that a side L2a that is one short side is positioned most upstream in the paper conveyance direction.

Paper feed tray 3 may further include an indicator 8 provided at a predetermined position of stage 15. The indicator 8 is a mark that indicates the position of side-restricting plate 9a in fold printing and serves as a guideline of the fold position P1 or P2 of paper SH1 (the guideline of the paper width). The operator can easily fold paper SH1 at the position P1 or P2 by folding paper SH1 with the paper width adjusted to the distance between side-restricting plates 9 while adjusting side-restricting plate 9a to the indicator 8.

MFP 100 executes printing when accepting an instruction to execute a print job after the folded paper SH1 is set and the setting of fold printing is accepted. MFP 100 feeds the folded paper SH1 through the inside of the apparatus, makes a first print on the folded paper SH1, and discharges paper SH1 to paper discharge tray 7.

Referring to FIG. 5, next, the operator removes paper SH1 from paper discharge tray 7 and arranges paper SH1 on stage 15 with the front/back direction of the paper and the direction of the ridge of the fold being aligned with a predetermined direction. Specifically, paper SH1 folded at the position P1 is arranged with front SH1a facing upward. Here, paper SH1 is arranged such that side L2b that is the other short side is arranged most upstream in the paper conveyance direction.

When the folded sheet SH1 is arranged in paper feed tray 3, MFP 100 feeds the folded paper SH1 through the inside of the apparatus, makes a second print on the folded paper SH1, and discharges paper SH1 to paper discharge tray 7.

Referring to FIG. 6, the operator then removes paper SH1 from paper discharge tray 7 and arranges paper SH1 on stage 15 with the front/back direction of the paper and the direction of the ridge of the fold being aligned with a predetermined direction. Specifically, paper SH1 folded at the position P2 is arranged with back SH1b facing upward. Here, paper SH1 is arranged such that side L2a that is one short side is positioned most upstream in the paper conveyance direction.

When the folded paper SH1 is arranged in paper feed tray 3, MFP 100 feeds the folded paper SH1 through the inside of the apparatus and makes a third print on the folded sheet SH1.

It is noted that the positions P1 and P2 can be set as desired as long as the folded paper SH1 has a width that can be fed through the inside of MFP 100 (such that the length LG1 of the short side of the folded paper SH1 becomes equal to or smaller than the maximum paper-feed width). For example, paper SH1 may be folded as follows.

Figure 7:
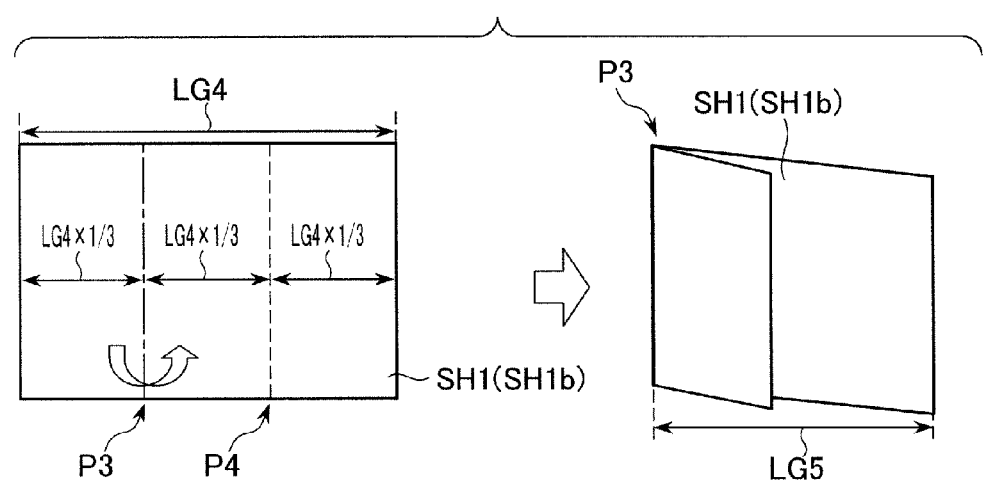
FIG. 7 is a diagram schematically showing a modification of the fold position of paper in the first embodiment of the present invention.

FIG. 7 is a diagram schematically showing a modification of the fold position of paper in the first embodiment of the present invention.

Referring to FIG. 7, in place of using the folding method shown in FIG. 3, the long sides of paper SH1 may be folded in advance at a position P3 or P4 such that the two short sides are parallel to each other and that the two short sides do not overlap each other. The positions P3 and P4 each are, for example, a position inside from the end on the long side of paper SH1 by a length of one third of the long side. Accordingly, a length LG5 of the long side of the folded paper SH1 is two thirds of a length LG4 of the long side of paper SH1 in the expanded state (LG5=LG4×⅔) (in this case, the maximum paper-feed width of MFP 100 is equal to or greater than the length LG5).

When double-sided printing on paper SH1 is performed, MFP 100 performs first and second image formation on paper SH1 folded at the position P3 by the operator. MFP 100 then performs third image formation on paper SH1 folded at the position P4 by the operator.

It is noted that paper SH1 may be arranged in paper feed tray 3 in any manner. For example, paper SH1 may be arranged in paper feed tray 3 with back SH1b facing down.

When accepting an instruction to start execution of fold printing on paper from the operator through operation panel 1, MFP 100 may display operation guidance, including the fold position of paper or the arrangement manner of paper on paper feed tray 3, on operation panel 1. Such a notice allows the operator to perform operation smoothly.

A method of dividing an image will now be described.

When fold printing on paper larger than the maximum paper-feed size is performed, image processing unit 106 divides images to be formed on the front and back of paper to print on into three images based on the size of paper to print on.

Figure 8:
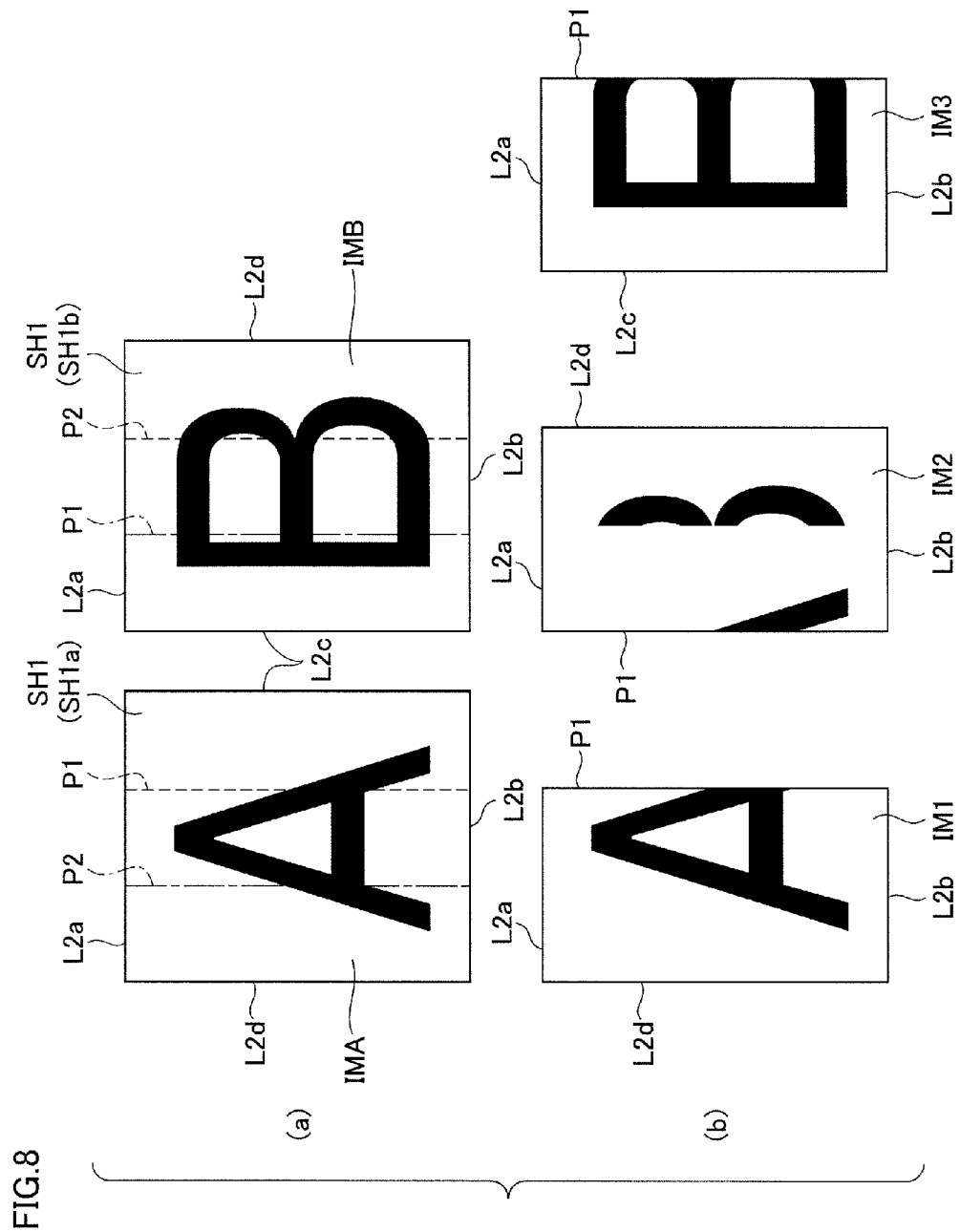
Figure 9:
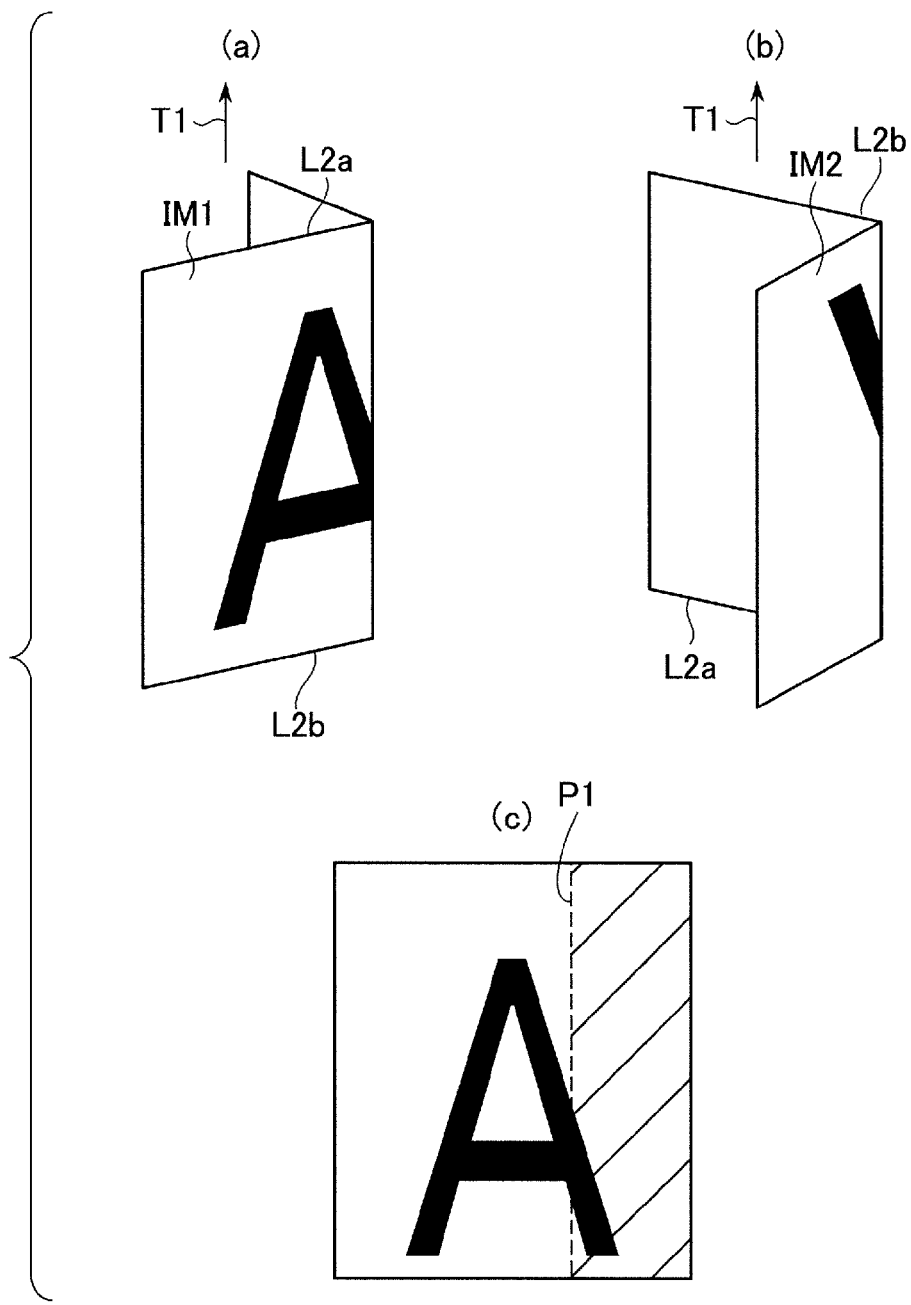
FIG. 9 is a diagram schematically showing an image formed on paper SH1 conveyed in MFP 100 in a case where MFP 100 performs single-sided printing.
Figure 10:
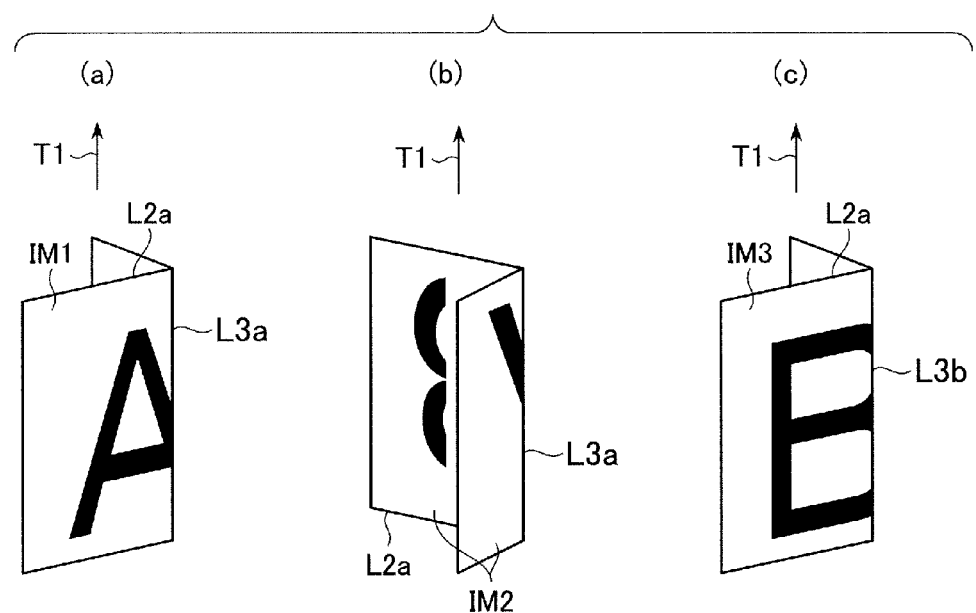
FIG. 10 is a diagram schematically showing images formed on paper SH1 conveyed in MFP 100 in a case where MFP 100 performs double-sided printing.

FIG. 8 is a diagram schematically showing a method of dividing images to be formed on the front and back of paper to print on. FIG. 8 to FIG. 10 each show an image actually formed on paper SH1.

Referring to FIG. 8(a), the upper side on the front SH1a and the upper side on the back SH1b of paper SH1 are a common side L2a, and the lower side on the front SH1a and the lower side on the back SH1b of paper SH1 are a common side L2b. The right side on the front SH1a and the left side on the back SH1b of paper SH1 are a common side L2c, and the left side on the front SH1a and the right side on the back SH1b of paper SH1 are a common side L2d. An image IMA on the front is an alphabet "A" and an image IMB on the back is an alphabet "B".

Image processing unit 106 divides images IMA and IMB into a first image IM1, a second image IM2, and a third image IM3 based on the size of paper SH1, as shown in FIG. 8(b).

First image IM1 is formed of a part of image IMA. Specifically, first image IM1 is formed of the front image present on the front SH1a side when paper SH1 is mountain-folded at position P1 as viewed from the front SH1a.

Second image IM2 is formed of the remaining part of image IMA and a part of image IMB. Specifically, second image IM2 is formed of the front image present on the back SH1b side and the back image that can be seen (not hidden by paper SH1) from the back SH1b side when paper SH1 is mountain-folded at the position P1 as viewed from the front SH1a.

Third image IM3 is formed of the remaining part of image IMB. Specifically, third image IM3 is formed of the back image present on the back SH1b side when paper SH1 is mountain-folded at the position P2 as viewed from the back SH1b.

In order to prevent displacement of the image to be printed due to variations in the fold position of paper, when the folded paper is arranged in paper feed tray 3 to create the second or third image, image processing unit 106 preferably identifies the actual size (i.e. the fold position) of the folded paper and corrects the division position of the image or the printing position for creating the second or third image. Preferably, paper width measuring unit 111 automatically detects the actual width of the folded paper based on the position of side-restricting plate 9a. Instead, input from the operator may be accepted through operation panel 1. In the case where input from the operator is accepted, scales are preferably provided on stage 15 in order to allow the operator to easily check the width of paper by visual recognition. Image processing unit 106 may determine the division position of the image not based on the actual fold position of paper but only based on the size of paper to print on, as a matter of course.

FIG. 9 is a diagram schematically showing an image formed on paper SH1 conveyed in MFP 100 in a case where MFP 100 performs single-sided printing.

Referring to FIG. 9, in single-sided printing, the operator sets paper SH1 in paper feed tray 3 in the manner shown in FIG. 4. MFP 100 conveys paper SH1 in the paper conveyance direction shown by arrow T1 and prints image IM1 on paper SH1 being conveyed such that the up/down direction of the alphabet "A" is the forward direction as shown in FIG. 9 (a) (first print). In the first print, approximately two thirds of the alphabet "A" is printed. Next, the operator sets paper SH1 in paper feed tray 3 in the manner shown in FIG. 5. MFP 100 conveys paper SH1 along the paper conveyance direction and prints image IM2 (excluding the part of the alphabet "B" in image IM2 in FIG. 8(b)) on paper SH1 being conveyed such that the up/down direction of the alphabet "A" is the reverse direction, as shown in FIG. 9 (b) (second print). As a result, as shown in FIG. 9 (c), when paper SH1 is unfolded, the alphabet "A" is printed on one side of paper. In FIG. 9 (c), the part printed for the second time is hatched with thin lines extending from the upper right to the lower left in the figure.

FIG. 10 is a diagram schematically showing an image formed on paper SH1 conveyed in MFP 100 in a case where MFP 100 performs double-sided printing.

Referring to FIG. 10, in double-sided printing, the operator sets paper SH1 in paper feed tray 3 in the manner shown in FIG. 4. MFP 100 conveys paper SH1 in the paper conveyance direction shown by arrow T1 and prints image IM1 on paper SH1 being conveyed such that the up/down direction of the alphabet "A" is the forward direction as shown in FIG. 10(a) (first print). In the first print, approximately two thirds of the alphabet "A" is printed. Next, the operator sets paper SH1 in paper feed tray 3 in the manner shown in FIG. 5. MFP 100 conveys paper SH1 along the paper conveyance direction and prints image IM2 on paper SH1 being conveyed such that the up/down direction of the alphabet "A" is the reverse direction, as shown in FIG. 10(b) (second print). In the second print, the remaining one third of the alphabet "A" and approximately one third of the alphabet "B" are printed. Next, the operator sets paper SH1 in paper feed tray 3 in the manner shown in FIG. 6. MFP 100 conveys paper SH1 along the paper conveyance direction and prints image IM3 on paper SH1 being conveyed such that the up/down direction of the alphabet "B" is the forward direction, as shown in FIG. 10(c) (third print). In the third print, the remaining two thirds of the alphabet "B" is printed.

Figure 11:
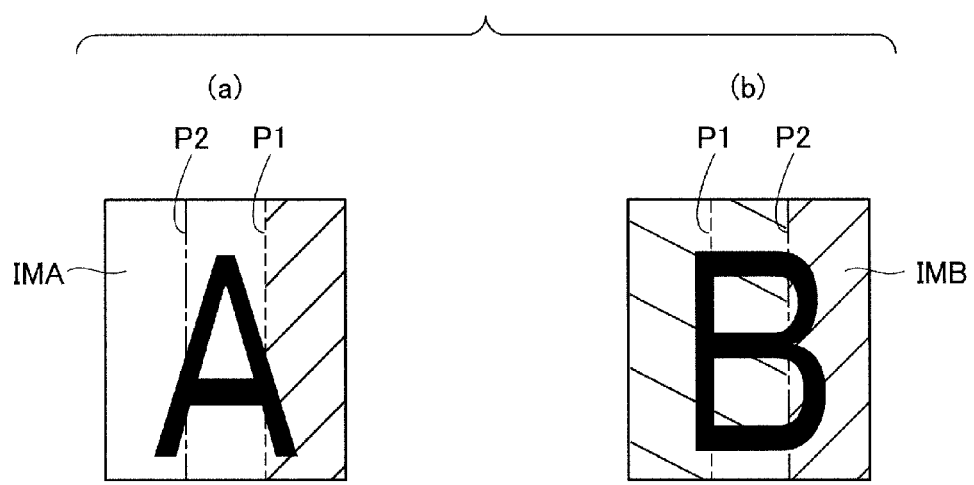
FIG. 11 is a diagram schematically showing an image formed on paper SH1 by MFP 100.

FIG. 11 is a diagram schematically showing an image formed on paper SH1 by MFP 100.

Referring to FIG. 11, as a result of three prints as shown in FIG. 10, when paper SH1 is unfolded, image IMA of the alphabet "A" is printed on the front of paper as shown in FIG. 11(a), and image IMB of the alphabet "B" is printed on the back of paper as shown in FIG. 11(b). Specifically, image IM1 and part of the front image included in image IM2 constitute the front image IMA, and part of the back image included in image IM2 and image IM3 constitute the back image IMB. In FIG. 11, the part printed for the second time is shown by hatch lines extending from the upper right to the lower left in the figure, and the part printed for the third time is shown by hatch lines extending from the upper left to the lower right in the figure.

Flowcharts of operation of MFP 100 in fold printing and double-sided printing will now be described.

Figure 12:
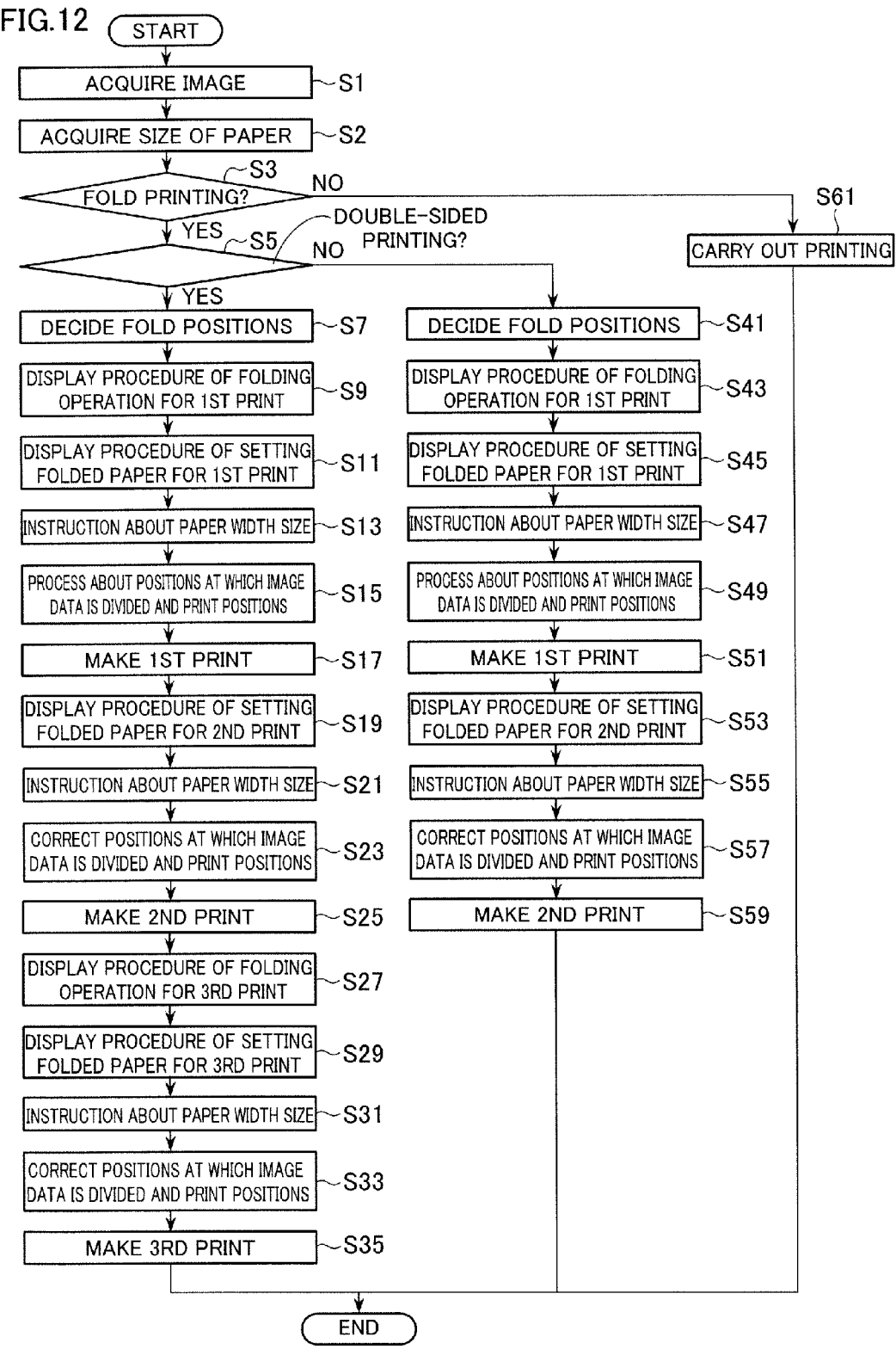
FIG. 12 is a flowchart showing operation of MFP 100 in the first embodiment of the present invention.

FIG. 12 is a flowchart showing operation of MFP 100 in the first embodiment of the present invention.

Referring to FIG. 12, upon accepting an instruction to start execution of printing from the operator, for example, through operation panel 1, CPU 101 of MFP 100 acquires an image to be formed on paper (S1). In step S1, CPU 101 may acquire, for example, an image read by scanner unit 108 or may acquire an image received from external equipment such as a PC (Personal Computer) or an image stored in storage unit 104. CPU 101 then acquires the setting of size of paper to print on (paper to be fed through the inside of MFP 100), for example, through operation panel 1 (S2). CPU 101 then determines whether the print settings accepted from the operator include fold printing (S3).

In step S3, if it is determined that the print settings include fold printing (YES in S3), CPU 101 determines whether the print settings accepted from the operator include double-sided printing (S5). On the other hand, in step S3, if it is determined that fold printing is not included (NO in S3), CPU 101 carries out printing based on the instruction (S61). The process then ends.

In step S5, if it is determined that double-sided printing is included (YES in S5), CPU 101 proceeds to the process in step S7. On the other hand, in step S5, if it is determined that double-sided printing is not included (NO in S5), CPU 101 proceeds to the process in step S41.

In step S7, CPU 101 decides the positions P1 and P2 that are the fold positions of paper, based on the size of paper to print on (S7), and displays the procedure of folding operation for the first print (position P1) on operation panel 107 (S9). In step S9, for example, a message "Adjust the side-restricting plate to the indicator and fold paper at one third of the short side from one end of paper" appears on operation panel 107. CPU 101 then displays the procedure of setting the folded paper for the first print on operation panel 107 (S11). In step S11, for example, a message "Set paper on paper feed tray such that the back of paper faces upward and the ridge of the fold is oriented to the left as viewed from the paper conveyance direction" appears on operation panel 107.

CPU 101 then accepts an instruction about the paper width (width size) in order to confirm the actual fold position of paper and the paper position on paper feed tray 3 (S13). As the instruction about the paper width, CPU 101 may accept the result automatically detected by paper width measuring unit 111 or may accept input from the operator through the operation panel. CPU 101 then creates the first to third images by deciding the positions at which the images to be formed on the front and back of paper are divided, based on the size of paper to print on and the width of paper, and decides the print positions of the first to third images on paper (S15). CPU 101 then makes the first print by forming the first image on paper (S17).

After completion of the first print, CPU 101 displays the procedure of setting the folded paper for the second print on operation panel 107 (S19). In step S19, for example, a message "Set paper on the paper feed tray such that the front of paper faces upward and the ridge of the fold is oriented to the left as viewed from the paper conveyance direction" appears on operation panel 107.

CPU 101 then accepts an instruction about the paper width in order to confirm the actual fold position of paper and the paper position on paper feed tray 3 (S21). CPU 101 then corrects the second image by correcting the positions at which the images to be formed on the front and back of paper are divided, based on the size of paper to print on and the width of paper, and corrects the print position of the second image on paper (S23). CPU 101 then makes the second print by forming the second image on paper (S25).

After completion of the second print, CPU 101 displays the procedure of folding operation for the third print (position P2) on operation panel 107 (S27). In step S27, for example, a message "Adjust the side-restricting plate to the indicator and fold paper at one third of the short side from the other end of paper" appears on operation panel 107. CPU 101 then displays the procedure of setting the folded paper for the third print on operation panel 107 (S29). In step S29, for example, a message "Set paper on the paper feed tray such that the front of paper faces upward and the ridge of the fold is oriented to the left as viewed from the paper conveyance direction" appears on operation panel 107.

CPU 101 then accepts an instruction about the paper width in order to confirm the actual fold position of paper and the paper position on paper feed tray 3 (S31). CPU 101 then corrects the third image by correcting the position at which the image to be formed on the back of paper is divided, based on the size of paper to print on and the width of paper, and corrects the print position of the third image on paper (S33). CPU 101 then makes the third print by forming the third image on paper (S35). The process then ends.

In step S41, CPU 101 decides the fold position of paper based on the size of paper to print on (S41) and displays the procedure of the first folding operation (position P1) on operation panel 107 (S43). CPU 101 then displays the procedure of setting the folded paper for the first time on display panel 107 (S45).

CPU 101 then accepts an instruction about the paper width (width size) (S47), decides the position at which the image to be formed on the front of paper is divided, based on the size of paper to print on and the width of paper, and decides the print position of the divided image on paper (S49). CPU 101 then makes the first print (S51).

After completion of the first print, CPU 101 displays the procedure of setting the folded paper for the second time on operation panel 107 (S53) and accepts an instruction about the paper width (S55). CPU 101 then corrects the position at which the image to be formed on the front and back of paper is divided, based on the size of paper to print on and the width of paper, and corrects the print position of the divided image (S57). CPU 101 then makes the second print (S59). The process then ends.

The processes in step S23 and S33 may be omitted. In this case, the image is divided at the position decided in step S15, and the first to third images are printed at the print positions decided in step S15. The operator may be notified of the positions P1 and P2 simultaneously, for example, in step S9.

The present embodiment can provide an image forming apparatus with improved printing efficiency.

According to the present embodiment, paper having a size exceeding the maximum paper-feed size of MFP 100 is fed through the inside of MFP 100 in a state in which the paper is folded at the position where the ends of the paper are shifted from each other, thereby enabling print on paper having a size exceeding the maximum paper-feed size of MFP 100. In addition, double-sided printing on paper having a size exceeding the maximum paper-feed size of MFP 100 is completed in, in total, three printing operations, thereby improving printing efficiency.

Second Embodiment

In the present embodiment, operation of an MFP having an automatic folding device will be described.

Figure 13:
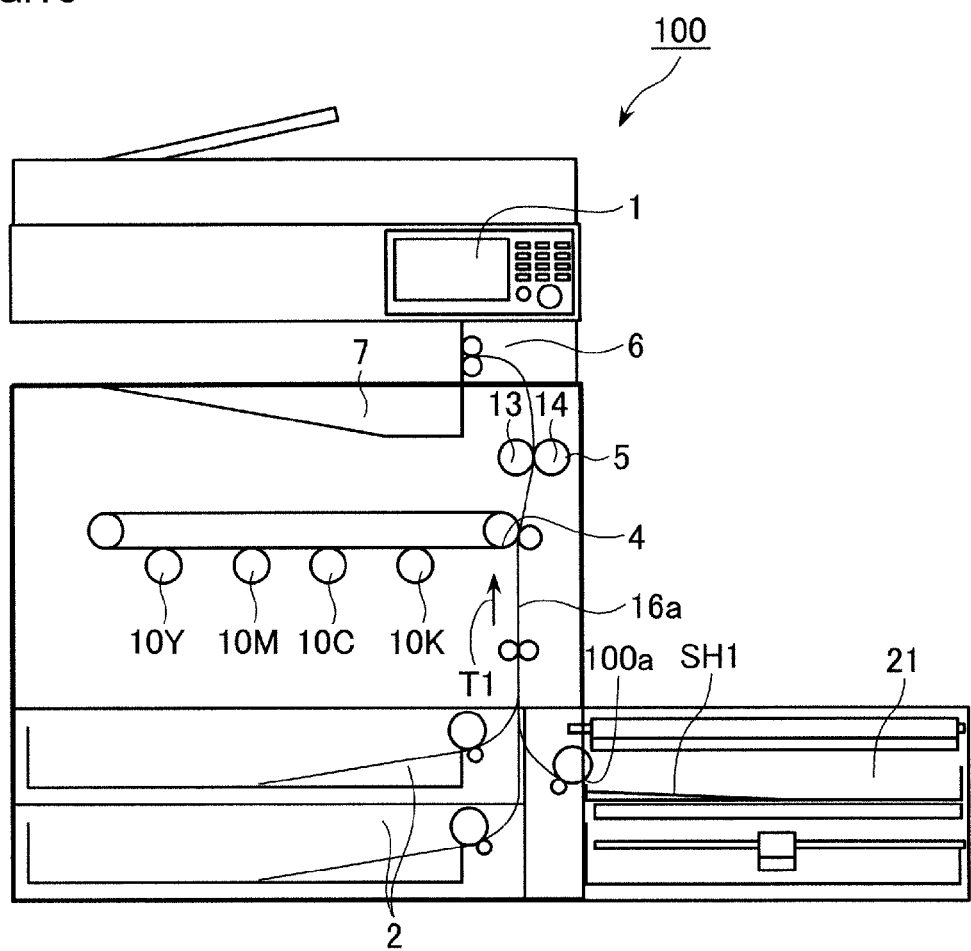
FIG. 13 is a cross-sectional view showing an overall configuration of an MFP 100 in a second embodiment of the present invention.

FIG. 13 is a cross-sectional view showing an overall configuration of an MFP 100 in a second embodiment of the present invention.

Referring to FIG. 13, MFP 100 in the present embodiment further includes an automatic folding device 21 coupled to paper-feed unit 100a for feeding paper into MFP 100, in place of the paper feed tray. A plurality of sheets of A3 paper SH1 are accommodated in automatic folding device 21. Automatic folding device 21 is controlled by CPU 101 to take out paper SH1 sheet by sheet from a plurality of sheets of paper SH1, perform a folding process of folding paper SH1 at the position P1, and thereafter send paper SH1 from paper-feed unit 100a into MFP 100 along the paper conveyance direction shown by arrow T1.

Figure 14:
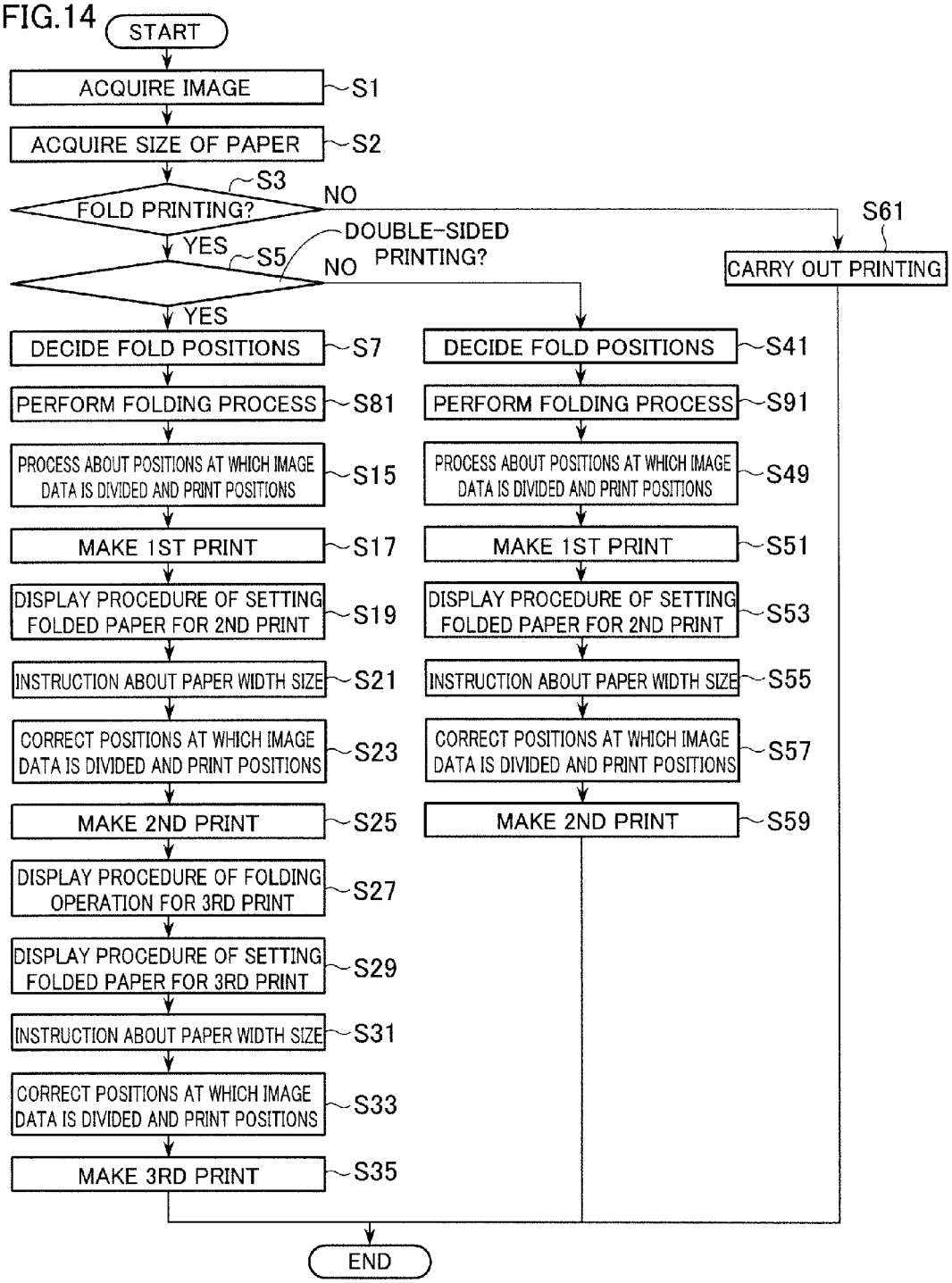
FIG. 14 is a flowchart showing operation of MFP 100 in the second embodiment of the present invention.

FIG. 14 is a flowchart showing operation of MFP 100 in the second embodiment of the present invention.

Referring to FIG. 14, this flowchart differs from the flowchart in the first embodiment shown in FIG. 12 in that a process in step S81 is performed between the process in step S7 and the process in step S15 and that a process in step S91 is performed between the process in step S41 and the process in step S49.

After deciding the fold position of paper in step S7, CPU 101 performs a process of taking out one sheet from a plurality of sheets of paper accommodated in automatic folding device 21 and folding the paper at the position P1 using automatic folding device 21 (S81). CPU 101 thereafter proceeds to the process in step S15, decides the positions at which the images to be formed on the front and back of paper are divided, and decides the print positions of the first to third images on paper (S15).

After deciding the fold position of paper in step S41, CPU 101 performs a process of taking out one sheet from a plurality of sheets of paper accommodated in automatic folding device 21 and folding the paper at the decided fold position using automatic folding device 21 (S91). CPU 101 thereafter proceeds to the process in step S49, decides the position at which the image to be formed on the front of paper is divided, and decides the print position of the divided image on paper (S49).

Except for the foregoing, the operation of MFP 100, the configuration of MFP 100, and the folding and setting methods of paper in the second and subsequent prints, and the method of dividing the image are the same as in the first embodiment, and a description thereof is not repeated.

The present embodiment achieves the similar effects as in the first embodiment. In addition, the operator does not have to fold paper at the position P1, which saves the operator time and trouble.

Third Embodiment

In the present embodiment, operation of an MFP having a duplex printing function will be described.

Figure 15:
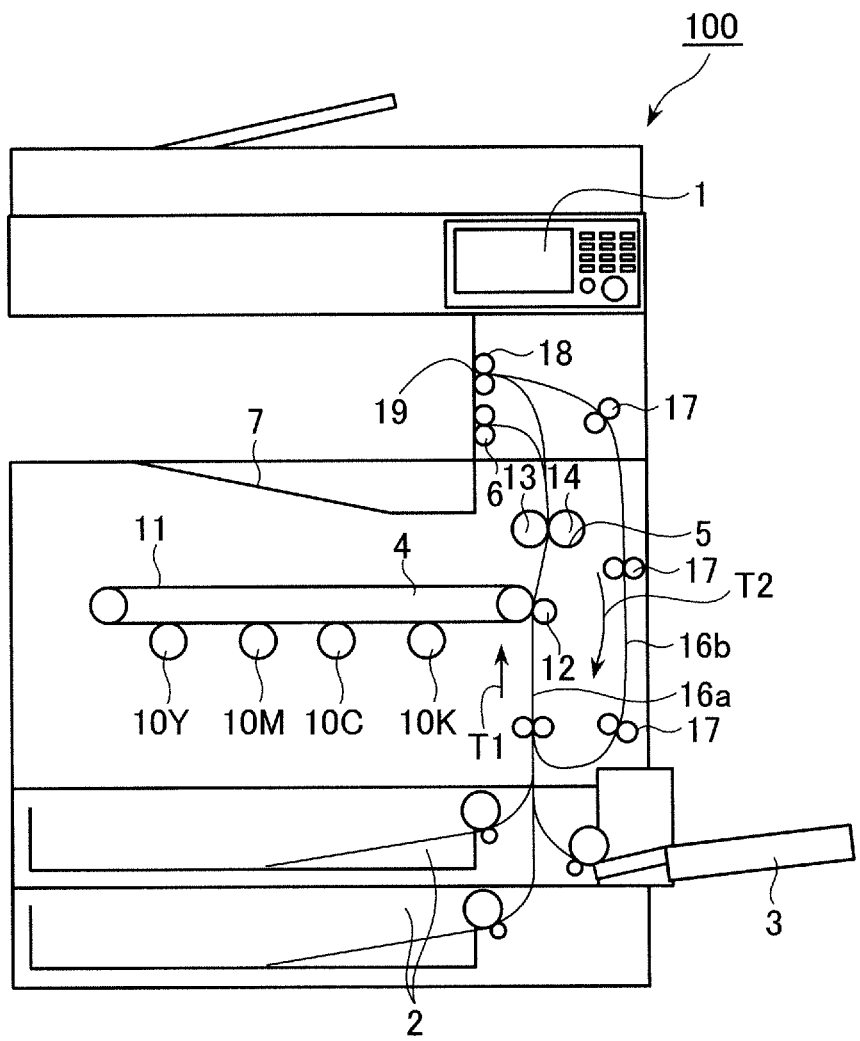
FIG. 15 is a cross-sectional view showing an overall configuration of an MFP in a third embodiment of the present invention.

FIG. 15 is a cross-sectional view showing an overall configuration of an MFP in a third embodiment of the present invention.

Referring to FIG. 15, MFP 100 further includes a plurality of rollers 17 that constitute a duplex conveyance path 16b, and a reversing roller 18 for reversing paper.

When fold printing and double-sided printing of paper SH1 are performed, paper SH1 accommodated in paper feed cassette 2 or paper feed tray 3 is conveyed through paper conveyance path 16a along the paper conveyance direction shown by arrow T1. Image forming unit 4 transfers a toner image onto paper SH1 conveyed through paper conveyance path 16a, and fixing unit 5 then thermally fixes the toner image. The first image is thus printed on paper SH1. Paper SH1 after printing is conveyed to a reverse paper exit 19 and switched back by reversing roller 18 to be conveyed through duplex conveyance path 16b along the reversed paper conveyance direction shown by arrow T2. Paper SH1 is then sent to paper conveyance path 16a again through duplex conveyance path 16b to have the second image printed thereon. The paper having the second image printed thereon is discharged to paper discharge tray 7 by paper discharge roller 6. The operator then folds paper SH1 discharged to paper discharge tray 7 at the position P2 and arranges the folded paper SH1 in paper feed tray 3. Paper SH1 is thereafter conveyed through paper conveyance path 16a along the paper conveyance direction to have the third image printed thereon and discharged to paper discharge tray 7.

When MFP 100 has a duplex printing function (automatic double-sided printing function), the operator does not have to set paper on paper feed tray 3 again for the second print after completion of the first print. Paper SH1 is discharged to the paper discharge tray in a folded state after completion of the second print.

Figure 16:
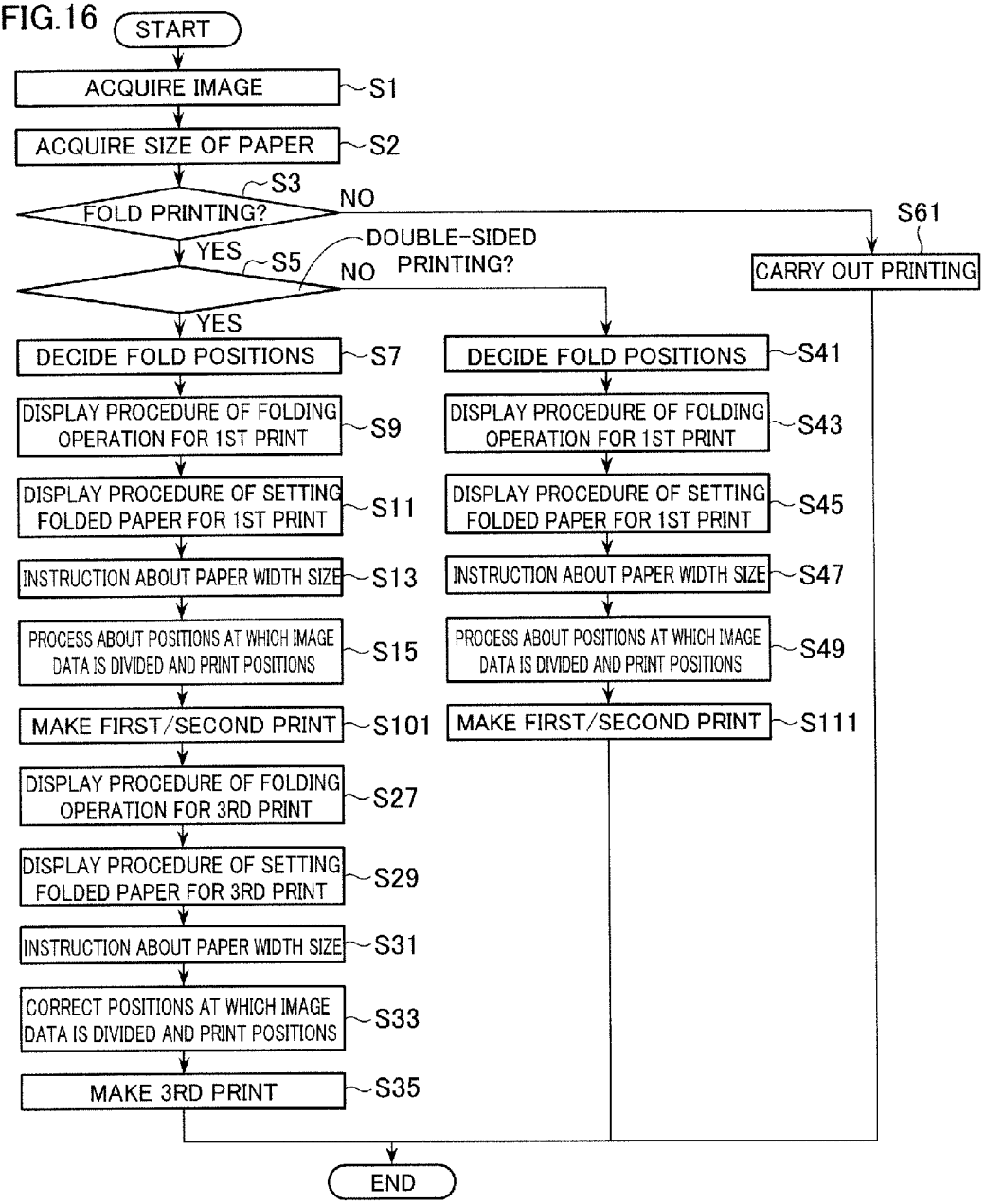
FIG. 16 is a flowchart showing operation of MFP 100 in the third embodiment of the present invention.

FIG. 16 is a flowchart showing operation of MFP 100 in the third embodiment of the present invention.

Referring to FIG. 16, this flowchart differs from the flowchart in the first embodiment shown in FIG. 12 in that a process in step S101 is perforated between the process in step S15 and the process in step S27 and that the process ends with a process in step S111 after the process in step S49.

After deciding the positions at which the images to be formed on the front and back of paper are divided, and deciding the print positions of the first to third images on paper in step S15, CPU 101 makes the first print by forming the first image on paper and makes the second print by forming the second image on paper (S101). CPU 101 thereafter proceeds to the process in step S27 and displays the procedure of folding operation for the third print (the position P2) on operation panel 107 (S27).

After deciding the position at which the image to be formed on the front of paper is divided and deciding the print position of the divided image on paper in step S49, CPU 101 makes the first and second prints (S111). CPU 101 thereafter terminates the process.

Except for the foregoing, the operation of MFP 100, the configuration of MFP 100, the method of folding and setting paper for the first and third prints, and the method of dividing the image are the same as in the first embodiment, and a description thereof is not repeated.

The present embodiment achieves the similar effects as in the first embodiment. In addition, the operator does not have to set the folded paper for the second print, thereby saving the operator time and trouble.

Fourth Embodiment

In the present embodiment, operation of an MFP having a duplex printing function and an output paper finisher equipped with an automatic folding device will be described.

FIG. 17 is a cross-sectional view showing an overall configuration of an MFP 100 in a fourth embodiment of the present invention.

Referring to FIG. 17, MFP 100 further includes an output paper finisher 20. Output paper finisher 20 is coupled to reverse paper exit 19 and is equipped with an automatic folding device.

When fold printing and double-sided printing of paper SH1 are performed, paper SH1 having the first and second images printed thereon is discharged from reverse paper exit 19 to output paper finisher 20. Paper SH1 discharged to output paper finisher 20 has the folded position changed to the position P2 by output paper finisher 20 and is fed from reverse paper exit 19 to duplex conveyance path 16b. Paper SH1 is then conveyed through duplex conveyance path 16b along the reversed paper conveyance path shown by arrow T2 and is then sent to paper conveyance path 16a again. Paper SH1 has the third image printed thereon while being conveyed through paper conveyance path 16a and discharged to paper discharge tray 7.

Figure 18:
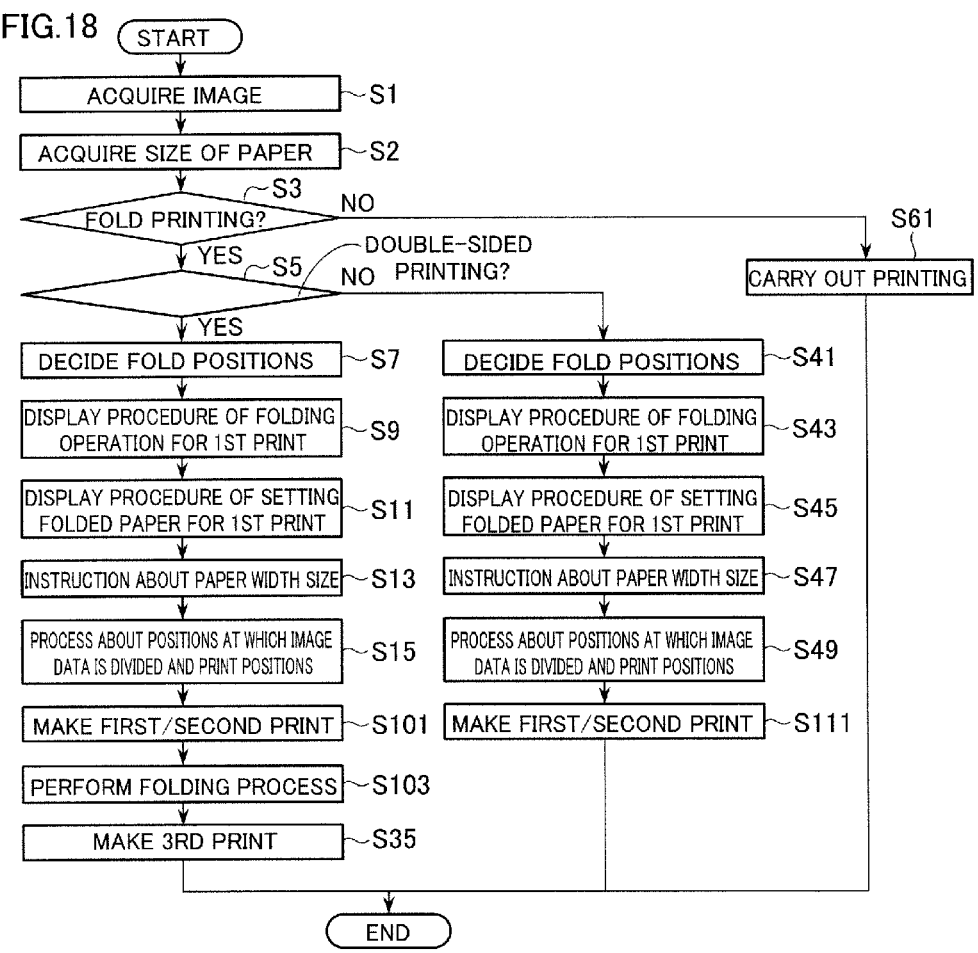
FIG. 18 is a flowchart showing operation of MFP 100 in the fourth embodiment of the present invention.

FIG. 18 is a flowchart showing operation of MFP 100 in the fourth embodiment of the present invention.

Referring to FIG. 18, this flowchart differs from the flowchart in the third embodiment shown in FIG. 16 in that a process in step S103 is performed between the process in step S101 and the process in step S35.

In step S101, after making the first and second prints, CPU 101 performs a process of folding paper at the position P2 using output paper finisher 20 (S103). CPU 101 thereafter proceeds to the process in step S35 for making the third print (S35).

Except for the foregoing, the operation of MFP 100, the configuration of MFP 100, the method of folding and setting paper for the first and second prints, and the method of dividing the image are the same as in the third embodiment, and a description thereof is not repeated.

The present embodiment achieves the similar effects as in the third embodiment. In addition, the operator does not have to fold paper for the third print and does not have to set the folded paper for the third print, thereby saving the operator time and trouble.

Fifth Embodiment

In the present embodiment, operation of an MFP in which a plurality of sheets of folded paper are accommodated in a paper feed cassette will be described.

Figure 19:
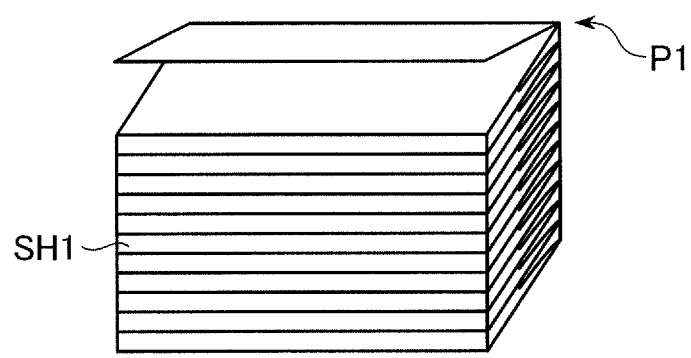
FIG. 19 is a perspective view schematically showing a plurality of sheets of folded paper accommodated in a paper feed cassette 2 in a fifth embodiment of the present invention.

FIG. 19 is a perspective view schematically showing a plurality of sheets of folded paper accommodated in paper feed cassette 2 in a fifth embodiment of the present invention. In FIG. 19, paper feed cassette 2 is not shown.

Referring to FIG. 19, MFP 100 in the present embodiment has the same configuration as the MFP in the fourth embodiment shown in FIG. 17. A plurality of sheets of paper SH1 folded at the position P1 are accommodated in a particular paper feed cassette 2 of a plurality of paper feed cassettes 2 of MFP 100. When fold printing and double-sided printing of paper SH1 are preformed, MFP 100 takes out paper SH1 sheet by sheet from a plurality of sheets of paper SH1 and sends paper SH1 from paper-feed unit 100a to the inside of MFP 100.

Figure 20:
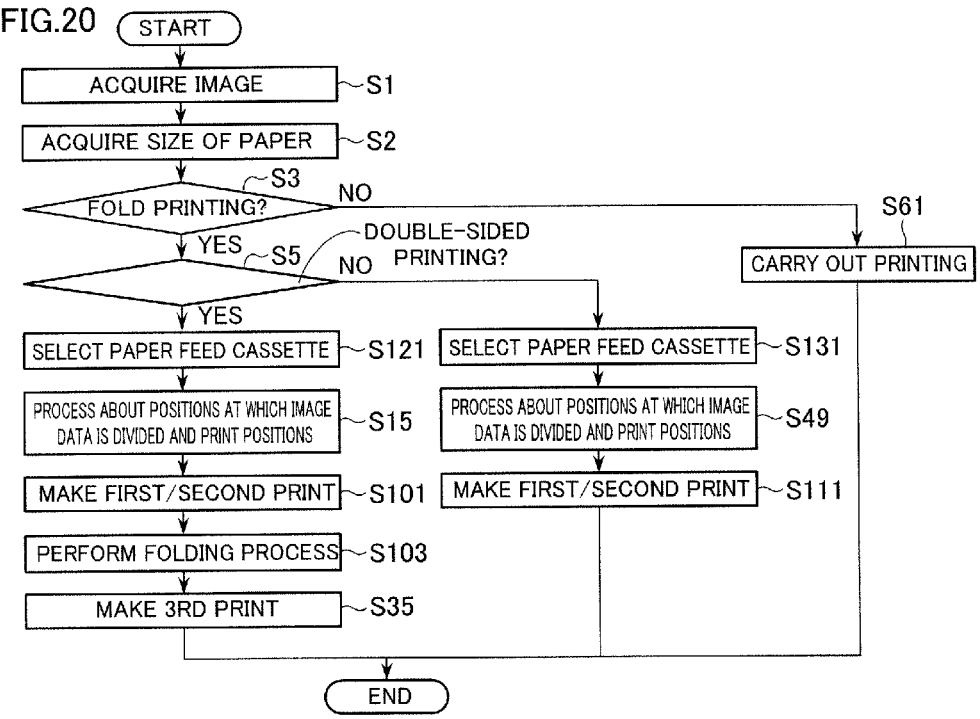
FIG. 20 is a flowchart showing operation of MFP 100 in the fifth embodiment of the present invention.

FIG. 20 is a flowchart showing operation of MFP 100 in the fifth embodiment of the present invention.

Referring to FIG. 20, this flowchart differs from the flowchart in the fourth embodiment shown in FIG. 18 in that if the determination in step S5 is YES, the process proceeds to step S15 after the process in step S121 is performed, and if the determination in step S5 is NO, the process proceeds to step S49 after the process in step S131 is performed.

In step S5, if it is determined that the print settings accepted from the operator include double-sided printing (YES in S5), CPU 101 selects paper feed cassette 2 in which the folded paper SH1 is accommodated, from a plurality of paper feed cassettes 2 (S121). CPU 101 thereafter proceeds the process in step S15, decides the positions at which the images to be formed on the front and back of paper are divided, and decides the print positions of the first to third images on paper (S15).

In step S5, if it is determined that the print settings accepted from the operator do not include double-sided printing (NO in S5), CPU 101 selects paper feed cassette 2 in which the folded paper SH1 is accommodated, from a plurality of paper feed cassettes 2 (S131). CPU 101 thereafter proceeds to the process in step S49, decides the position at which the image to be formed on the front of paper is divided, and decides the print position of the divided image on paper (S49).

Except for the foregoing, the operation of MFP 100, the configuration of MFP 100, the method of folding and setting paper for the second and subsequent prints, and the method of dividing the image are the same as in the fourth embodiment, and a description thereof is not repeated.

The present embodiment achieves the similar effects as in the fourth embodiment. In addition, the operator does not have to fold paper at the position P1 because paper SH1 folded in advance at the position P1 is accommodated in paper feed cassette 2, thereby saving the operator time and trouble.

Sixth Embodiment

In the present embodiment, a preferred relationship between a configuration of the paper feed tray and the fold position of paper will be described.

Figure 21:
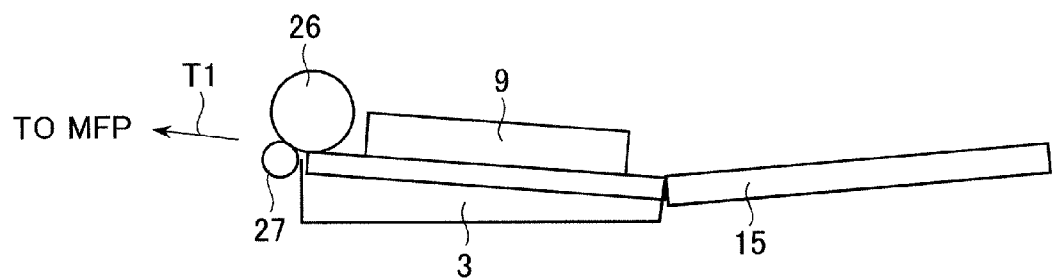
FIG. 21 is a cross-sectional view showing an overall configuration of paper feed tray 3 in a sixth embodiment of the present invention.
Figure 22:
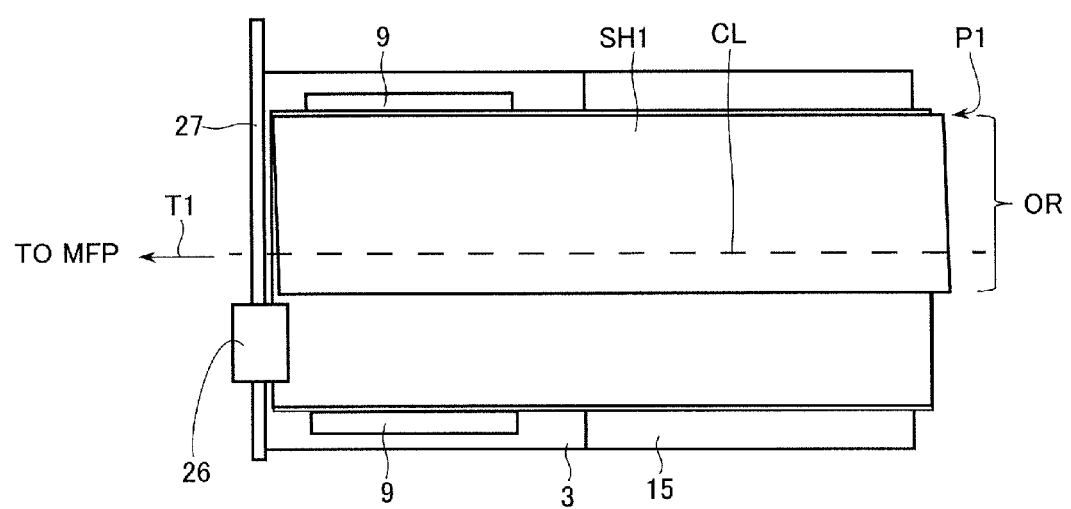
FIG. 22 is a plan view showing a schematic configuration of paper feed tray 3 in the sixth embodiment of the present invention.

FIGS. 21 and 22 show an overall configuration of paper feed tray 3 in a sixth embodiment of the present invention, where FIG. 21 is a cross-sectional view and FIG. 22 is a plan view.

Referring to FIGS. 21 and 22, MFP 100 includes a paper feed roller 26 for sending paper SH1 from paper feed tray 3 to the inside of MFP 100 and a separation roller 27 for separating the overlapping paper when conveying paper SH1. A nip section between paper feed roller 26 and separation roller 27 is positioned on one end side (the lower side in FIG. 22) with respect to the center line CL in the width direction of the paper conveyance path shown by arrow T1. When paper SH1 is folded at the position P1 or P2, paper folding unit 110 decides the position P1 or P2 such that an overlapping portion OR of paper SH1 does not come into contact with the nip section between paper feed roller 26 and separation roller 27.

Except for the foregoing, the operation of MFP 100, the configuration of MFP 100, the method of folding and setting paper, and the method of dividing the image are the same as in the first embodiment, and a description thereof is not repeated.

When the folded paper SH1 is fed from paper feed tray 3, the separating force of separation roller 27 may displace the overlapping portion of paper SH1. In order to prevent this, a mechanism of retracting separation roller 27 in fold printing or a mechanism of releasing transmission of the separating force of separation roller 27 has conventionally been used. As described in the first embodiment, the position inside from the end on the short side of paper SH1 by one third of the short side is set as the position P1 or P2, so that the folded paper SH1 has a portion where paper does not overlap. The nip section between paper feed roller 26 and separation roller 27 comes into contact with this portion, thereby preventing displacement of the overlapping portion of paper SH1 even without using the conventional mechanism.

[Others]

In the foregoing embodiments, the MFP decides the fold position of paper based on the size of paper to print on, by way of example. The MFP, however, may fix the fold position always at the same position or may decide the fold position based on manual input by the user. In particular when the fold position is decided based on manual input by the user, the MFP may accept the selection of paper size, for example, from the operation panel and automatically decide the fold position based on the selected size.

The maximum paper-feed size and the maximum paper-feed width of the image forming apparatus, and the size of paper that the image forming apparatus makes a print on may be set as desired and may be those other than the above. The order in which the first to third images are printed may be set as desired.

The foregoing first to sixth embodiments may be combined as appropriate. For example, the first to fifth embodiments may be combined with the sixth embodiment. The configuration having the automatic folding device in the second embodiment or the configuration in which the folded paper is accommodated in advance in the paper feed cassette in the fifth embodiment may be combined with the configuration having the duplex printing function and the output paper finisher in the fourth embodiment. In this case, the operator does not have to perform the paper folding operation and the paper setting operation.

The processes in the foregoing embodiments may be performed by software or using hardware circuitry. A program executing the processes in the foregoing embodiments may be provided, or a recording medium such as a CD-ROM, a flexible disk, a hard disk, a ROM, a RAM, or a memory card encoded with the program may be provided to users. The program is executed by a computer such as a CPU. The program may be downloaded to the apparatus through a communication line such as the Internet.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus comprising:
   an image acquisition unit for acquiring front and back images to be formed on paper;
   an image division unit for dividing the front and back images into a first image formed of a part of the front image, a second image formed of a remaining part of the front image and a part of the back image, and a third image formed of a remaining part of the back image;
   a first image forming unit for forming the first and second images on the paper folded at a first position; and
   a second image forming unit for forming the third image on the paper folded at a second position,
   wherein the first and second image forming units form images such that the part of the front image and the remaining part of the front image constitute the front image and the part of the back image and the remaining part of the back image constitute the back image when the paper is unfolded.

2. The image forming apparatus according to claim 1, further comprising a decision unit for deciding the first and second positions such that two sides of the paper that are parallel to each other and are not folded do not overlap each other when the paper is folded.

3. The image forming apparatus according to claim 2, wherein the decision unit decides positions on short sides of the paper that are inside from long sides thereof by a length equal to one third of the short side, as the first and second positions.

4. The image forming apparatus according to claim 2, further comprising:

a first notification unit for giving notification of the first position before the first image forming unit forms an image; and
a second notification unit for giving notification of the second position before the second image forming unit forms an image.

5. The image forming apparatus according to claim 2, further comprising a size acquisition unit for acquiring a size of the paper,
   wherein the decision unit decides the first and second positions based on the size of the paper that is acquired by the size acquisition unit.

6. The image forming apparatus according to claim 2, further comprising:
   a paper feed roller for sending the paper; and
   a separation roller for separating overlapping paper when the paper is sent,
   wherein the decision unit decides the first or second position such that an overlapping portion of the paper folded at the first or second position does not come into contact with a nip section between the paper feed roller and the separation roller.

7. The image forming apparatus according to claim 1, further comprising:
   a size measuring unit for measuring a size of the paper folded at the first or second position; and
   an image correction unit for correcting the second or third image divided by the image division unit, based on the size of the paper that is measured by the size measuring unit.

8. The image forming apparatus according to claim 1, further comprising a first folding unit for folding the paper at the first position before the first image forming unit forms an image.

9. The image forming apparatus according to claim 1, further comprising a second folding unit for folding the paper at the second position after the first image forming unit forms an image and before the second image forming unit forms an image.

10. A method of controlling an image forming apparatus, comprising:
    acquiring front and back images to be formed on paper;
    dividing the front and back images into a first image formed of a part of the front image, a second image formed of a remaining part of the front image and a part of the back image, and a third image formed of a remaining part of the back image;
    forming the first and second images on the paper folded at a first position; and
    forming the third image on the paper folded at a second position,
    wherein, in forming the first and second images and forming the third image, the images are formed such that the part of the front image and the remaining part of the front image constitute the front image and the part of the back image and the remaining part of the back image constitute the back image when the paper is unfolded.

11. A non-transitory computer-readable recording medium encoded with a control program for an image forming apparatus, the control program causing a computer to execute:
    acquiring front and back images to be formed on paper;
    dividing the front and back images into a first image formed of a part of the front image, a second image formed of a remaining part of the front image and a part of the back image, and a third image formed of a remaining part of the back image;

forming the first and second images on the paper folded at a first position; and forming the third image on the paper folded at a second position, wherein, in forming the first and second images and forming the third image, the images are formed such that the part of the front image and the remaining part of the front image constitute the front image and the part of the back image and the remaining part of the back image constitute the back image when the paper is unfolded.

* * * * *